(No Model.)
C. KOEBER.
CORNED BEEF PRESS.
No. 354,512. Patented Dec. 14, 1886.
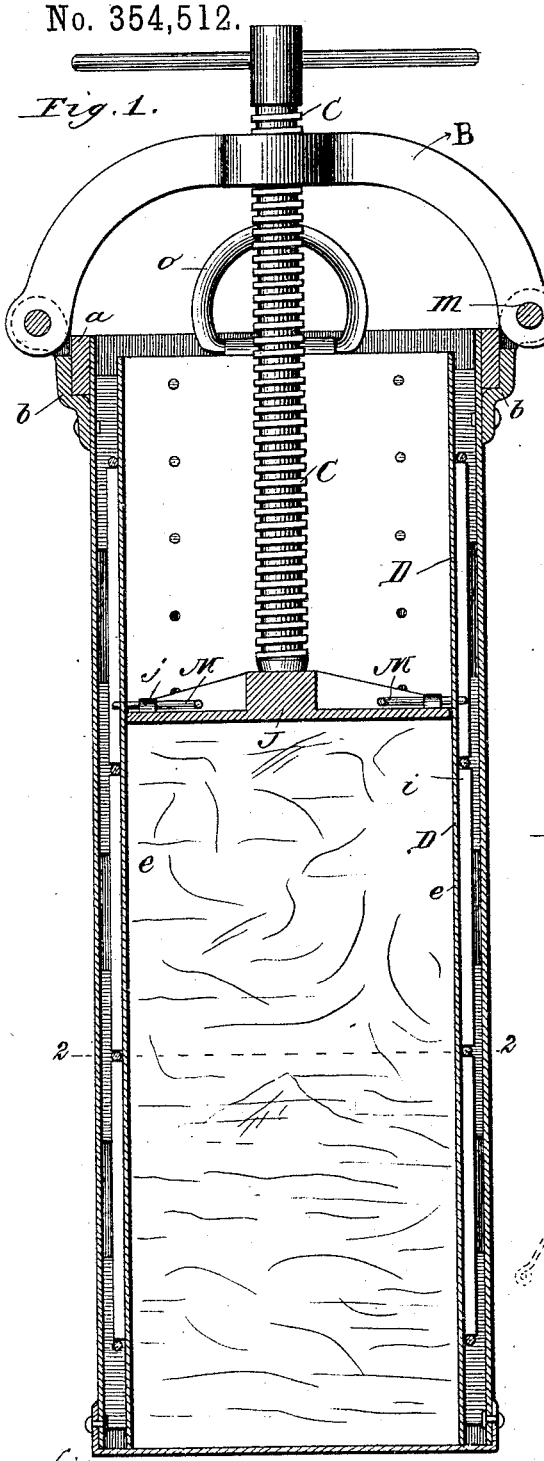
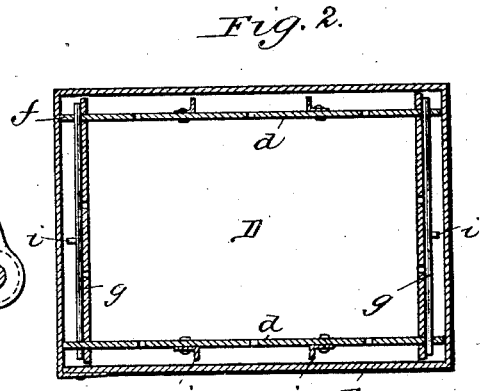
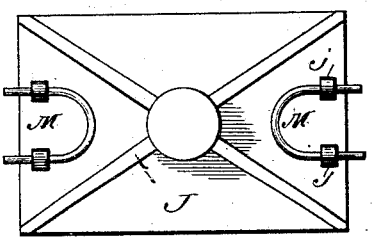
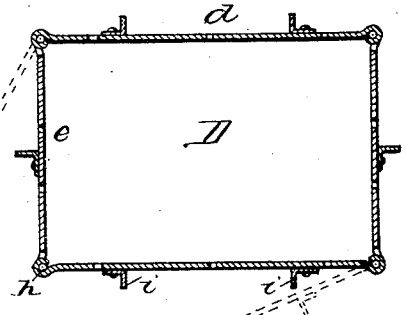
Witnesses.
W. Rossiter
Otto Luebkert
Inventor
Charles Koeber
By Wm H Lotz
Atty.

UNITED STATES PATENT OFFICE.

CHARLES KOEBER, OF CHICAGO, ILLINOIS.

CORNED-BEEF PRESS.

SPECIFICATION forming part of Letters Patent No. 354,512, dated December 14, 1886.

Application filed August 10, 1886. Serial No. 210,588. (No model.)

*To all whom it may concern:*

Be it known that I, CHARLES KOEBER, a citizen of the United States of America, residing at Chicago, in the county of Cook and State of Illinois, have invented certain new and useful Improvements in Corned-Beef Presses, of which the following is a specification, reference being had therein to the accompanying drawings.

The object of my invention is to provide an apparatus for pressing boiled corned beef into bricks or cakes of convenient shape, and from which, after cooling in a refrigerator, such cakes can be readily removed; and for that purpose it principally consists of a casing provided with a detachable yoke and pressing-screw, of a perforated knockdown mold removably inserted into the casing for containing the corned beef, and of a pressing-plunger provided with locking-bolts for holding the corned beef under pressure while in the refrigerator, all as will be hereinafter more fully described and specifically claimed.

In the accompanying drawings, Figure 1 represents a vertical section of the device complete; Fig. 2, a horizontal section on line 2 2 in Fig. 1; Figs. 3 and 4, a plan and edge view of the plunger detached, and Fig. 5 a horizontal section of a modified construction of the mold.

Corresponding letters in the several figures of the drawings designate like parts.

A denotes the sheet-metal casing of a parallelopipedon shape, the sides and bottom of which are made imperforate, and which has an open top. The upper edge of this casing A is strengthened by a rectangular iron band, $a$, fixed thereto by soldering or riveting, with two bifurcated-eyed ears, $b$, secured to centers of opposite sides for removably connecting by pins $m$ a yoke, B, which is tapped through its center for a screw, C, having a T-handle. Into this casing A is inserted a mold, D, of corresponding shape with casing A, but sufficiently smaller to leave an open space of uniform width between such mold D and casing A.

The mold D consists of four perforated sheet-metal plates, $d$ and $e$, connected either to be entirely detachable from each other by plates $e$, being provided with tongues $f$, that enter slots near the edges of plates $d$, and are locked by small rods $g$, passed through holes in such tongues $f$, as shown in Figs. 1 and 2; or, as shown by Fig. 5, the four plates $d$ and $e$ may be hinged together, with one of the hinge-wires $h$ made to be extractible, that after the mold has been lifted from the casing its sides can be folded out flat. The plates $d$ and $e$ have each secured vertical spacing-ribs $i$, which, when the mold D is inserted into the casing A, will hold such plates from bulging out while the beef is being pressed by butting against the sides of such casing. This mold D is open on top and bottom, and to its top edge it has handles $o$, by which to lift it out from casing A. The pressing-plunger J is made snugly to enter mold D, and near each end it has two rigid eyes, $j$, for guiding a V-shaped bolt, M, the ends of which will enter any one pair of perforations in plates $e$ of mold D. The mold D having been inserted into casing A, it is filled with boiled corn-beef, as hot as possible, and the jelly extracted therefrom by boiling is poured over it. Then the plunger J is placed on top, and then by the screw C is forced down, whereby the beef is pressed into a compact mass, the surplus jelly escaping through the perforations of the mold and filling up the open spaces around such mold. After thus sufficiently compressed, the bolts M are pushed outward to engage with the proper perforations for holding the plunger J after the screw C is loosened, and with its yoke B is disconnected and removed. The casing, with its contents, is now to be placed in the refrigerator, or it is to be surrounded by broken ice and water, to remain so for about six hours, by which time the corned beef and jelly are chilled to be solid, when the mold D can be extracted from the casing, and by opening it the corned beef can be removed in a fine shape and condition for slicing. By leaving the jelly thus with the beef and surrounding the mold, the beef is juicy and nourishing, while otherwise it would be coarse and dry, and would have no binding to permit slicing.

What I claim is—

1. The combination, with the imperforate casing A and with a suitable pressing device, of perforated knockdown mold D, removably inserted into such casing, substantially as and for the purpose set forth.

2. The combination, with casing A and with a suitable pressing device detachably secured thereto, of perforated knockdown mold D, removably inserted into such casing, and plunger J, with bolts M, substantially as and for the purpose set forth.

3. The combination, with casing A and with a suitable pressing device, of perforated knockdown mold D, removably inserted into such casing, and provided with spacing-ribs $i$, and plunger J, having bolts M, substantially as and for the purpose set forth.

4. The combination, with imperforate casing A, having detachable yoke B and screw C, of perforated knockdown mold D, having handles $o$, and of plunger J, having bolts M, all substantially as and for the purpose set forth.

In testimony whereof I affix my signature in presence of two witnesses.

CHARLES KOEBER.

Witnesses:
 WM. H. LOTZ,
 OTTO LUEBKERT.